United States Patent [19]

Nebelung et al.

[11] Patent Number: 4,596,591
[45] Date of Patent: Jun. 24, 1986

[54] SECTION OF A GLASSWARE FORMING MACHINE OF THE INDIVIDUAL SECTION TYPE

[75] Inventors: Hermann H. Nebelung; Fritz Futterknecht, both of Zurich, Switzerland

[73] Assignee: Emhart Industries, Inc., Farmington, Conn.

[21] Appl. No.: 666,712

[22] Filed: Oct. 31, 1984

[30] Foreign Application Priority Data

Nov. 16, 1983 [GB] United Kingdom ............... 8330570

[51] Int. Cl.⁴ .............................................. C03B 9/40
[52] U.S. Cl. ...................................... 65/217; 65/261; 65/360
[58] Field of Search ................. 65/216, 217, 261, 360

[56] References Cited

U.S. PATENT DOCUMENTS 2,225,631 12/1940 Hawley, Jr. et al. ............. 65/360 X
3,357,811 12/1967 Youkers et al. .................. 65/360 X Primary Examiner—Arthur Kellogg
Attorney, Agent, or Firm—H. Samuel Kieser

[57] ABSTRACT

The section comprises a supporting frame which supports a mould arrangement. Drive means is associated with the mould arrangement and is operable to open and close a mould of the mould arrangement. The drive means comprises two vertically-extending drive shafts mounted for turning movement about respective vertical axes to move mould portions. The drive means also comprises at least one rotary hydraulic motor operable to turn the drive shafts. The motor or motors are mounted on the underside of a removable portion of a table of the supporting frame so that the motor or motors and the removable portions can be removed from the section as a unit.

6 Claims, 4 Drawing Figures

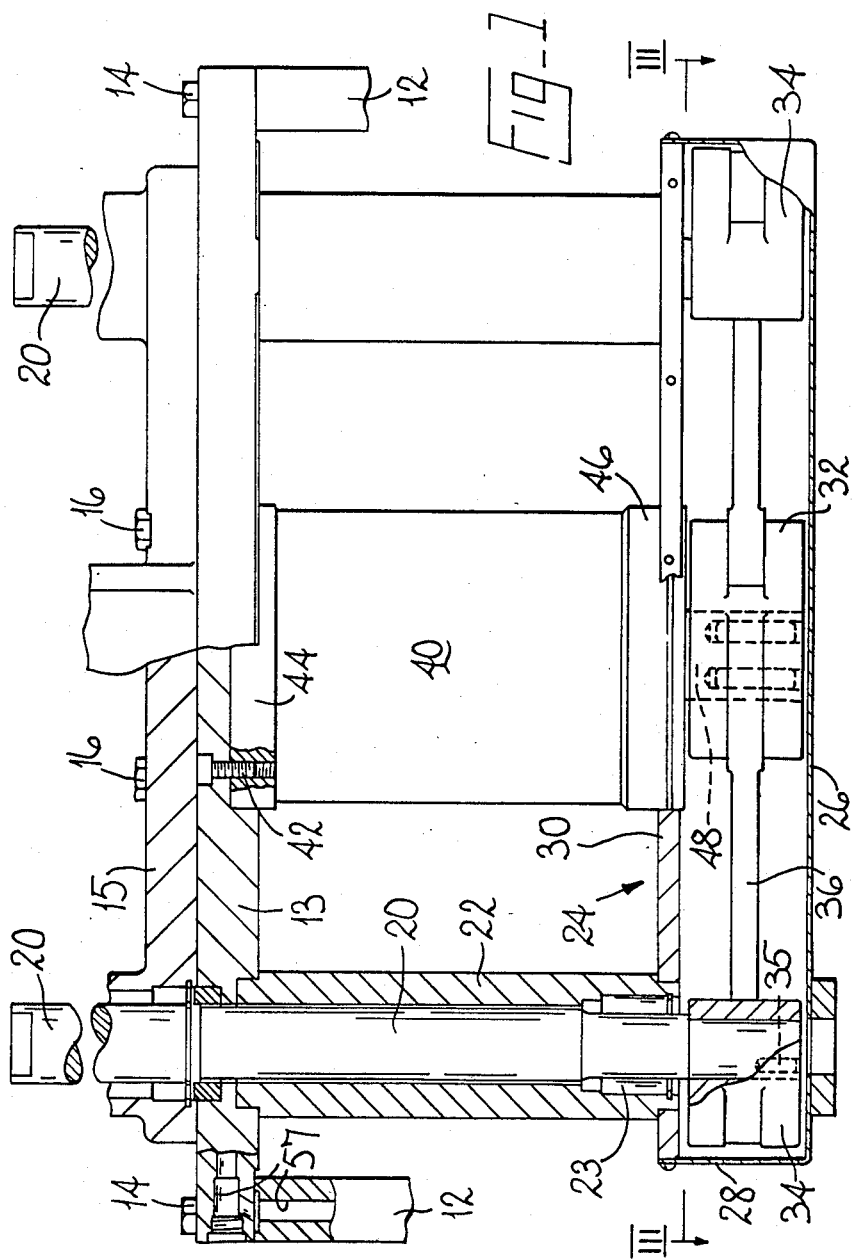

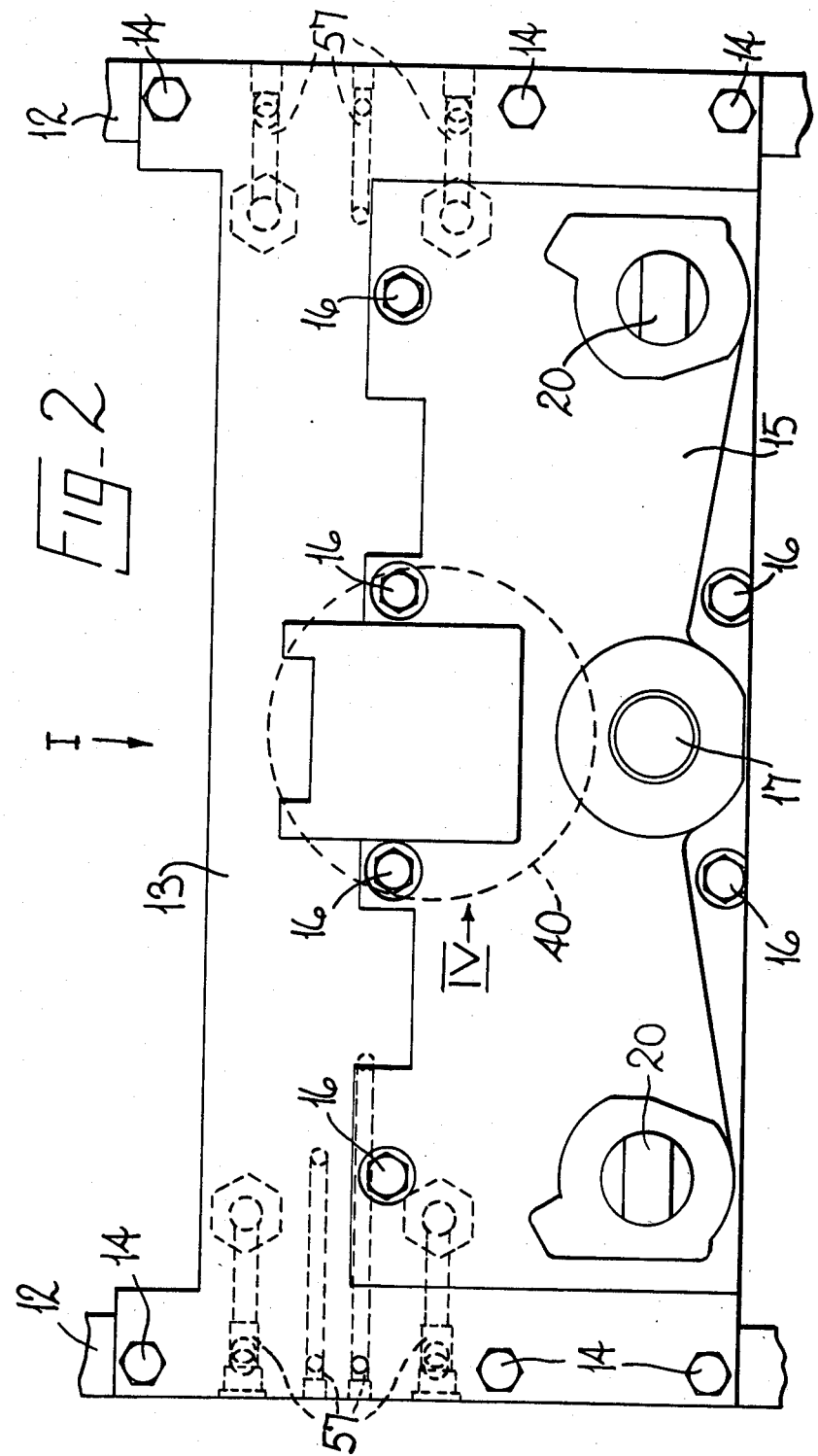

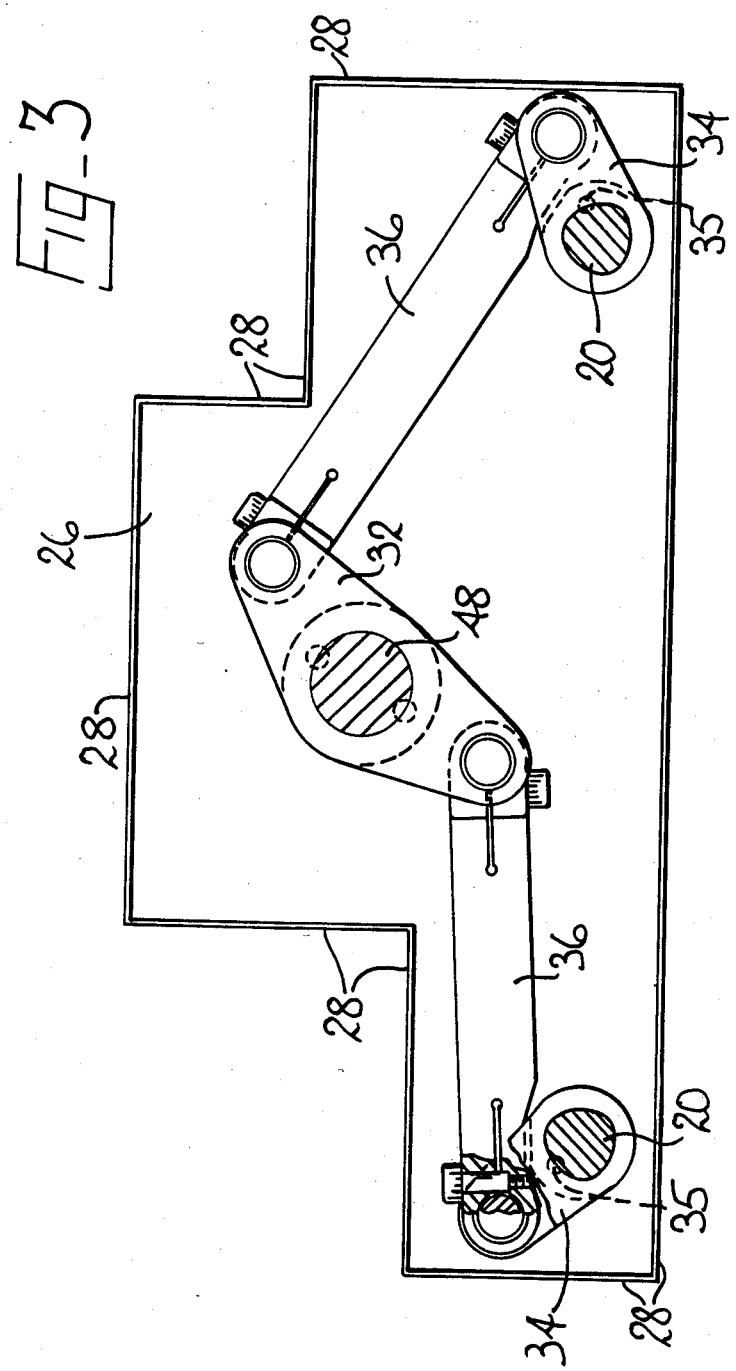

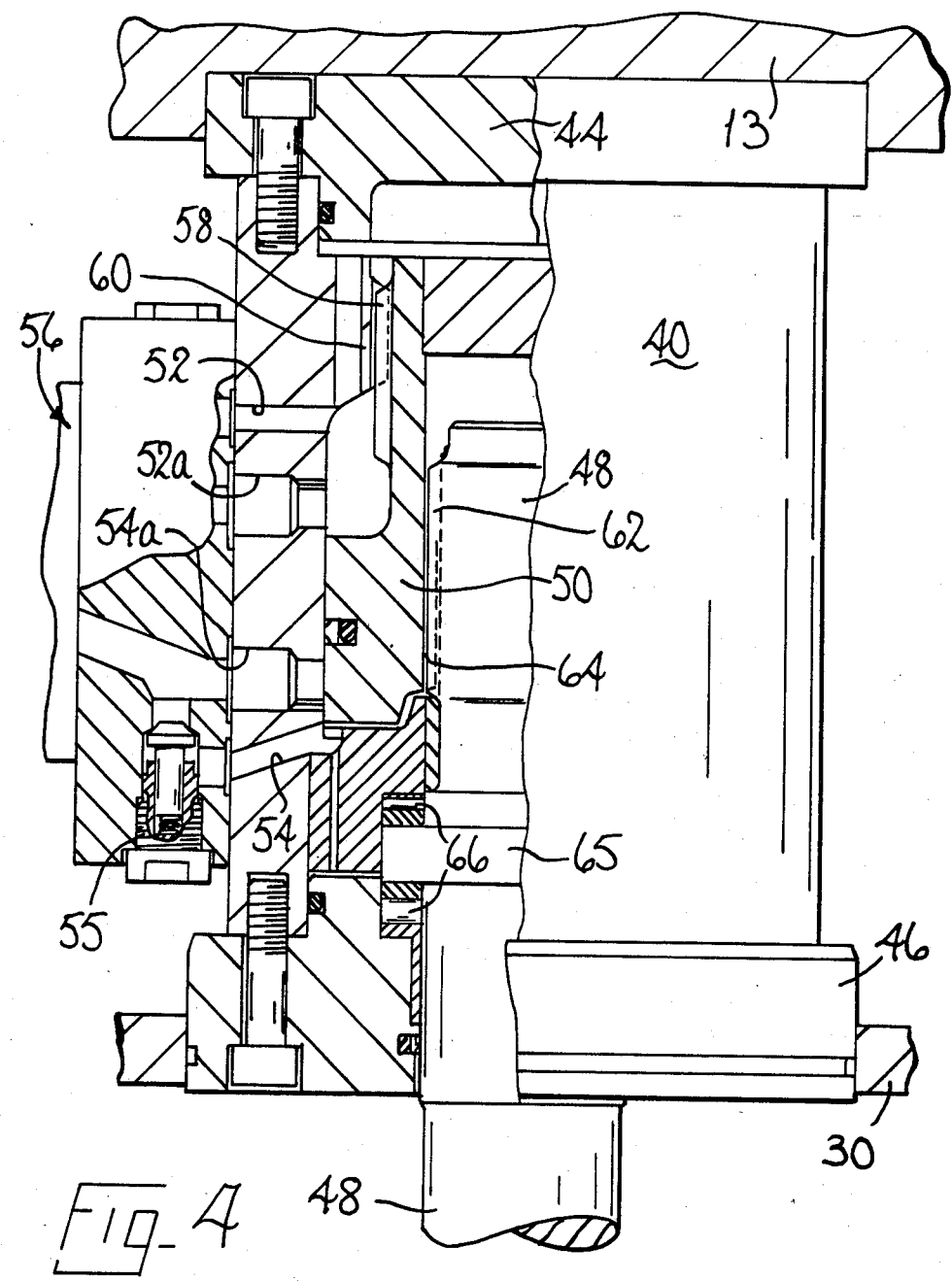
Fig_4

SECTION OF A GLASSWARE FORMING MACHINE OF THE INDIVIDUAL SECTION TYPE

BACKGROUND OF THE INVENTION

This invention is concerned with a section of a glassware forming machine of the individual section type comprising a supporting frame which serves to support a mould arrangement operable to form gobs of molten glass received by the section into parisons, and a further mould arrangement operable to form parisons formed by the first-mentioned mould arrangement into articles of glassware, the supporting frame comprising vertically-extending walls and a horizontally-extending table supported by the walls and serving to support mould portion supporting arms of at least one of the mould arrangements, which arms are movable to open and close a mould of the mould arrangement in the operation of the section, the section also comprising drive means associated with the mould arrangement and operable to move the supporting arms of its associated mould arrangement as aforesaid, the drive means comprising two vertically-extending drive shafts each mounted on the frame for turning movement about a vertical axis thereof, link means linking each shaft to an associated one of the supporting arms so that, when the shaft is turned about its vertical axis, the supporting arm is moved to open or close the mould, connecting means connecting the shafts so that the shafts turn together about their respective axes through equal angles, and motor means operable to turn the shafts about their respective axes to move the supporting arms as aforesaid.

In a glassware forming machine of the individual section type, a number of sections each of which forms a glassware forming unit are arranged side-by-side to receive gobs of molten glass from a gob distributor which supplies gobs to each section in turn. The sections operate to form the gobs into articles of glassware which are fed to a common conveyor.

In a conventional section of a glassware forming machine of the individual section type, the supporting frame of the section comprises four vertically-extending walls forming a box-like structure and a horizontally-extending table which is integral with the walls. The supporting frames of the sections of the glassware forming machine are arranged side-by-side in close proximity to one another on a common base plate to which bottom portions of the walls are secured. The table has various apertures therethrough in which operating mechanisms of the section are mounted. Each of the mould arrangements of the section comprises a carrier member which is removably mounted on top of the table above two circular apertures therein. The carrier member comprises a vertically projectihg shaft on which two mould portion supporting arms of the mould arrangement are pivotally mounted form movement in opposite directions to open and close moulds formed by mould portions mounted on the mould portion supporting arms. The carrier member also provides bearings in which two vertically-extending drive shafts are mounted which form part of drive means for causing the mould portion supporting arms to move to open and close the moulds. Each drive shaft is connected by link means to an associated one of the supporting arms so that, when the shaft is turned about its vertical axis, the supporting arm is moved to open or close a mould. Each drive shaft projects downwardly through one of the apertures in the table over which the carrier member is mounted and has a splined lower end portion which is received in a complementary recess of a link member which is pivotally mounted on the base plate of the machine. The two link members are connected by further links to a lever of the drive means which is pivotally mounted on the base plate for movement about a vertical axis. This lever is also pivotally connected to the piston of a pneumatic piston and cylinder assembly mounted on the base plate. The piston and cylinder assembly forms motor means operable to cause the lever to turn about its vertical axis which in turn causes the link members to pivot and the drive shafts to turn about their vertical axes so that the mould portion supporting arms are moved. Because of the necessity to provide high mould-closing forces, the cylinder of the piston and cylinder assembly is of large diameter.

In a conventional section as described in the last preceding paragraph, those portions of the mould arrangements which are located above the table or which project through apertures in the table and are not firmly connected to members below the table can readily be removed for maintenance and/or replacement; this includes the drive shafts which can be lifted vertically out of the link members since their splined portion can be removed from the complementary recess. However, those portions of the mould arrangement which are located on the base plate are inaccessible being substantially surrounded by the walls of the supporting frame and covered by the table thereof. Thus, should a fault occur in the piston and cylinder assembly mounted on the base plate, it is necessary to close down the section of the machine concerned, and in many cases adjacent sections also, to enable the frame to be removed from the base plate to provide access to the piston and cylinder assembly. This results in considerable loss of production.

It is an object of the present invention to provide a section of a glassware forming machine of the individual section type in which the motor means of the drive means of the mould arrangement are more readily accessible than in a conventional section.

BRIEF SUMMARY OF THE INVENTION

The invention provides a section of a glassware forming machine of the individual section type comprising a supporting frame which serves to support a mould arrangement operable to form gobs of molten glass received by the section into parisons, and a further mould arrangement operable to form parisons formed by the first-mentioned mould arrangement into articles of glassware, the supporting frame comprising vertically-extending walls and a horizontally-extending table supported by the walls and serving to support mould portion arms of at least one of the mould arrangements, which arms are movable to open and close a mould of the mould arrangement in the operation of the section, the section also comprising drive means associated with the mould arrangement and operable to move the supporting arms of its associated mould arrangement as aforesaid, the drive means comprising two vertically-extending drive shafts each mounted on the frame for turning movement about a vertical axis thereof, link means linking each shaft to an associated one of the supporting arms so that, when the shaft is turned about its vertical axis, the supporting arm is moved to open or close the mould, connecting means connecting the shafts so that the shafts turn together about their respective axes through equal angles, and motor means operable to turn the shafts about their respective axes to move the supporting arms as aforesaid, wherein the motor means of the drive means comprises at least one rotary hydraulic motor arranged to turn the shafts through a predetermined arc about their respective vertical axes, the motor or motors being mounted on the underside of a removable portion of the table so that the motor or motors and the removable portion can be removed from the section as a unit.

In a section according to the last preceding paragraph, the removable portion of the table can be removed from the remainder of the section taking with it the rotary hydraulic motor or motors to which easy access is thus obtained.

The connecting means may comprise further link means linking the drive shafts to a lever which is pivoted about a vertical axis to cause both shafts to turn about their respective vertical axes. In this case, the motor means comprises a rotary hydraulic motor operable to pivot the lever about its vertical axis through a predetermined arc.

In order to provide easy access to the lever and the further link means of the drive means, the lever and the further link means may be supported by the removable portion of the table so that they are removable therewith.

Alternatively, the motor means may comprise two rotary hydraulic motors, each arranged to turn one of the drive shafts, the motors being connected by the connecting means so that they operate together to turn the drive shafts simultaneously through equal angles. Conveniently, the connecting means may be a link pivotally connected to arms which project from output shafts of the motors.

Conveniently, the drive shafts of the drive means may be supported by the removable portion of the table so that they are also removable therewith.

Conveniently, the supporting arms of the mould arrangement may be pivotally mounted on a shaft which is supported by the removable portion of the table so that the shaft, the supporting arms, and the link means linking the drive shafts to the supporting arms are removable with the removable portion of the table. This may be achieved by providing a conventional carrier member which is mounted on top of the removable portion of the table.

In order to provide motor means which is capable of generating the mould closing pressures required and also is sufficiently light that it can easily be removed with the removable portion of the table, the or each rotary hydraulic motor may comprise a cylinder and a piston movable within the cylinder, the piston having a screw-threaded connection with the cylinder such that, when the piston is moved along the cylinder it is caused to turn about a longitudinal axis of the cylinder, the piston also having a connection with an output shaft of the motor such that, when the piston turns about the longitudinal axis of the cylinder, the output shaft turns.

In order to enable the rotary hydraulic motor or motors to be constructed in a more compact manner, the connection between the piston of the rotary hydraulic motor and the output shaft may be a screw-threaded connection of opposite hand to the connection between the piston and the cylinder.

BRIEF DESCRIPTION OF THE DRAWINGS

There now follows a detailed description, to be read with reference to the accompanying drawings, of a section of a glassware forming machine of the individual section type which is illustrative of the invention. It is to be understood that the illustrative section has been selected for description by way of example and not of limitation of the invention.

In the drawings:

FIG. 1 is a front view, with parts broken away to show the construction, of a portion of the illustrative section;

FIG. 2 is a plan view of the illustrative section, the direction of view of FIG. 1 being shown by the arrow I;

FIG. 3 is a cross-sectional view taken on the line III—III in FIG. 1; and

FIG. 4 is a detailed view, with parts broken away to show the construction, of a rotary hydraulic motor of the illustrative section taken in the direction of the arrow IV in FIG. 2.

DETAILED DESCRIPTION OF PREFERRED EMBODIMENT OF THE INVENTION

The illustrative section shown in the drawings is a section of a glassware forming machine of the individual section type. The section comprises a supporting frame which serves to support a mould arrangement operable to form gobs of molten glass received by the section into parisons, and a further mould arrangement operable to form parisons formed by the first-mentioned mould arrangement into articles of glassware. The supporting frame comprises vertically-extending walls 12 extending along opposite sides of the section and a horizontally-extending table supported by the walls 12 and serving to support mould portion supporting arms of a parison-forming mould arrangement of the section. The table comprises a removable portion 13 which rests on upper surfaces of the walls 12 and is removably screwed to them by screws 14.

The illustrative section also comprises a carrier member 15 mounted on top of the removable portion 13 and secured thereto by screws 16. The carrier member 15 comprises an upwardly extending shaft 17 on which mould portion supporting arms of the mould arrangement are pivotally mounted in conventional manner. The mould portion supporting arms are not shown in the drawings but are movable to open and close a mould of the mould arrangement in the operation of the section in a well-known manner.

The illustrative section also comprises drive means associated with the mould arrangement and operable to move the supporting arms of its associated mould arrangement to pivot the arms about the shaft 17 in opposite directions so that mould portions carried by the arms are moved together to close a mould or away from one another to open a mould. The drive means comprises two vertically-extending drive shafts 20 which extend downwardly through apertures in the removable portion 13 and the carrier member 15 and are each mounted for turning movement about a vertical axis thereof. The drive means also comprises link means (not shown) of conventional type linking each shaft to an associated one of the supporting arms so that, when the shaft 20 was turned about its vertical axis, the supporting arm is moved pivoting about the shaft 17 to open or close the mould. Beneath the removable portion 13 the drive shafts 20 extend downwardly within hollow cylindrical pillars 22 which contain bearings 23 for the shafts 20 and also serve to support a box 24 which is therefore slung beneath the removable portion 13 and is removable therewith.

The box 24 has a base plate 26, sidewalls 28 and a top plate 30 secured to the pillars 22. The box 24 provides an enclosed structure the shape of which can be seen from FIG. 3. The box 24 contains further link means linking each drive shaft 20 to a lever 32 which is pivotal about a vertical axis within the box 24. The further link means comprises a horizontal arm 34 connected to a lower end portion of each drive shaft 20. The arms 34 fit over non-cylindrical lower end portions of the drive shafts 20 and are pinned thereto by pins 35. The further link means also comprises two links 36 pivotally connected to the arms 34 and to opposite end portions of the lever 32. The arrangement being such that, when the lever 32 is pivoted about a central vertical axis thereof, the links 36 cause the shafts 20 to be turned about their vertical axes to open or close the mould.

The illustrative section also comprises motor means operable to pivot the lever 32 about its vertical axis to cause the mould to be opened or closed. The motor means comprises a rotary hydraulic motor arranged to pivot the lever 32 through a predetermined arc about its vertical axis. This motor is mounted on the underside of the removable portion of the table 13 so that the motor and the removable portion can be removed from the section as a unit. The rotary hydraulic motor comprises a cylinder 40 which is secured to the underside of the removable portion 13 by means of screws 42 which enter an end cap 44 of the cylinder 40. A lower end cap 46 of the cylinder 40 is mounted in a circular aperture in the top plate 30 of the box 24. The motor has an output shaft 48 which extends along the axis of the lever 32 and is secured thereto. Thus, when the output shaft 48 is turned by operation of the motor, the lever 32 is caused to pivot about its axis. The motor also comprises a piston 50 movable within the cylinder 40 when hydraulic fluid under pressure is introduced into the cylinder 40 through one or both of upper ports 52 and 52a or one or both of lower ports 54 and 54a thereof, the flow of the hydraulic fluid into or out of the ports being controlled by valve means 56 secured to the side of the cylinder 40. The ports 52 and 54 are at the extreme upper and lower ends respectively of the movement of the piston 50 and the ports 52a, 54a are displayed vertically therefrom. The hydraulic supply to the ports 52 and 54 is via one-way valves 55 (one shown in FIG. 4). The arrangement is such that, fluid cannot leave the cylinder 40 through the ports 52 and 54 and the ports 52a and 54a are progressively closed as the piston 50 approaches its upper or lower extreme position so that the outlet from the cylinder 40 is progressively throttled and the motion cushioned. Hydraulic fluid is supplied to the valve means 56 through passages 57 in the walls 12 and the removable portion 13. The piston 50 has a screw-threaded connection with the cylinder 40 such that, when the piston 50 is moved along the cylinder 40, it is caused to turn about a longitudinal axis of the cylinder. The screw-threaded connection is formed between a screw thread 58 formed on the exterior of an upwardly extending cylindrical projection of the piston 50 and a screw thread 60 formed on the interior of an upper portion of the cylinder 40. The piston 50 also has a connection with the output shaft 48 of the motor which is connected to the lever 32 linking the shafts 20 such that, when the piston 50 turns about the longitudinal axis of the cylinder, the lever 32 pivots about its vertical axis. This connection is made via the output shaft 48 which has an upper portion which is received in a cylindrical recess in the piston 50 and is connected to the piston 50 by a screw-threaded connection of opposite hand to the connection between the piston 50 and the cylinder 40. This connection is formed by a screw-threaded portion 62 of the drive shaft 48 and an interior thread 64 in the recess in the piston 50. In order to prevent the output shaft 48 from moving longitudinally thereof, it has a flange portion 65 which is held against longitudinal movement by bearings 66 mounted on the end cap 46. The arrangement of screw threaded connections of opposite hand causes the output shaft 48 to rotate twice as quickly as the piston 50 thereby allowing a more compact motor than if only one screw-threaded connection were present.

In the illustrative section, should a fault occur in the mould arrangement, the rotary hydraulic motor can be removed from the section by undoing the screws 14 and lifting the removable portion 13 and all parts which are secured thereto out of the section. Thus, access can be obtained to all parts of the mould arrangement and the entire mould arrangement can, in the event of damage occurring thereto, readily be removed and replaced by another unit. When the removable portion 13 of the table is removed from the section, the rotary hydraulic motor, the lever 32, and the link means 34 and 36 are also removable therewith. The supporting arms of the mould arrangements which are pivotally mounted on the shaft 17 which is supported by the carrier member 15 on the removable portion 13 is also removable with the removable portion 13 along with the link means linking the drive shafts 20 to the supporting arms. However, the link means and the supporting arms can be removed separately by removing the carrier member 15 from the removable portion 13 by releasing the screws 16.

We claim:

1. A section of a glassware forming machine of the individual section type comprising a supporting frame which serves to support a mold arrangement, the supporting frame comprising spaced vertical walls, a horizontally extending supporting table removably supported on said walls and serving to support mold portion supporting arms, which arms are movable to open and close a mold, drive means for moving the supporting arms, said drive means including two vertically extending drive shafts, means supporting said shafts on said removable table for turning movement about a vertical axis, motor means supported by said removable table, and connecting means connecting said motor to said shafts for transmitting motion to said shafts, said connecting means being mounted on said removable table.

2. A section according to claim 1 wherein said motor means and connecting means are positioned beneath said removable table.

3. A section according to claim 1, wherein the connecting means comprises link means linking the drive shafts to a lever which is pivoted about a vertical axis to cause both shafts to turn about their respective vertical axes, and the motor means comprises a rotary hydraulic motor operable to pivot the lever about its vertical axis through a predetermined arc.

4. A section according to claim 1, wherein the motor means comprises two rotary hydraulic motors, each arranged to turn one of the drive shafts, the motors being connected by the connecting means so that they cooperate together to turn the drive shafts simultaneously through equal angles.

5. A section according to claim 1, wherein the motor is a hydraulic motor and comprises a cylinder and a piston movable within the cylinder, the piston having a screw-threaded connection with the cylinder such that, when the piston is moved along the cylinder, it is caused to turn about a longitudinal axis of the cylinder, the piston also having a connection with an output shaft of the motor such that, when the piston turns about the longitudinal axis of the cylinder, the output shaft turns.

6. A section according to claim 5, wherein the connection between the piston of the rotary hydraulic motor and the output shaft is a screw-threaded connection of opposite hand to the connection between the piston and the cylinder.

* * * * *